US010120139B2

(12) United States Patent
Lee et al.

(10) Patent No.: US 10,120,139 B2
(45) Date of Patent: Nov. 6, 2018

(54) AUTOMATIC OPTICAL FIBER INSERTING APPARATUS AND FIBER INSERTING METHOD

(71) Applicant: ADC Telecommunications (Shanghai) Distribution Co., Ltd., Shanghai (CN)

(72) Inventors: Hang Lee, Shanghai (CN); Zongshen Leng, Shanghai (CN); Yongjun Yuan, Shanghai (CN); Chuanwu Chen, Shanghai (CN)

(73) Assignee: ADC Telecommunications (Shanghai) Distribution Co., Ltd. (CN)

( * ) Notice: Subject to any disclaimer, the term of this patent is extended or adjusted under 35 U.S.C. 154(b) by 0 days.

(21) Appl. No.: 15/023,324

(22) PCT Filed: Sep. 1, 2014

(86) PCT No.: PCT/IB2014/064170
§ 371 (c)(1),
(2) Date: Mar. 18, 2016

(87) PCT Pub. No.: WO2015/040516
PCT Pub. Date: Mar. 26, 2015

(65) Prior Publication Data
US 2016/0223758 A1   Aug. 4, 2016

(30) Foreign Application Priority Data

Sep. 18, 2013 (CN) .......................... 2013 1 0428328
Sep. 18, 2013 (CN) .......................... 2013 2 0581145

(51) Int. Cl.
*G02B 6/36* (2006.01)
*G02B 6/38* (2006.01)

(52) U.S. Cl.
CPC ......... *G02B 6/3837* (2013.01); *G02B 6/3843* (2013.01); *G02B 6/3885* (2013.01); *G02B 6/3898* (2013.01)

(58) Field of Classification Search
None
See application file for complete search history.

(56) References Cited

U.S. PATENT DOCUMENTS 3,591,294 A *  7/1971  Neil ..................... G01B 11/043
                                                         250/559.26
4,464,817 A     8/1984  Johnson et al.
(Continued)

FOREIGN PATENT DOCUMENTS

CN    203526926 U    4/2014
JP    63-231409 A    9/1988
(Continued)

OTHER PUBLICATIONS

International Search Report for International Application No. PCT/IB2014/064170 dated Dec. 2, 2014 (4 pages).

*Primary Examiner* — Chris Chu
(74) *Attorney, Agent, or Firm* — Merchant & Gould P.C.

(57) ABSTRACT

Disclosed is a fiber inserting apparatus comprising: a fiber clamp; a ferrule clamp opposite to the fiber clamp; and a clamp control controlling relative movement of the fiber clamp and the ferrule clamp on the rails, wherein a fiber inserting operation is performed based on the relative movement towards each other between the fiber clamp and the ferrule clamp. The fiber inserting apparatus may further comprise a straightening section comprising a chamber, elongated slots extending in a fiber inserting direction, a first drive for driving the chamber in a first direction so that the elongated slots move close to and away from the end of the bare fiber, and a second drive driving the chamber to move backwards and forwards in the fiber inserting direction, (Continued)

wherein the elongated slots are in communication with the chamber and a pressure in the chamber is smaller than that in the elongated slots when inserting the fiber. With the present invention, it is possible to simply operate the fiber insertion of 18 ferrules at one time, saving labor time and improving insertion efficiency.

14 Claims, 8 Drawing Sheets

(56) References Cited

U.S. PATENT DOCUMENTS

| | | |
|---|---|---|
| 4,994,079 A | 2/1991 | Genese et al. |
| 2003/0000257 A1* | 1/2003 | Chang .................... G02B 6/245 65/425 |
| 2003/0128952 A1 | 7/2003 | Proscia et al. |

FOREIGN PATENT DOCUMENTS

| | | |
|---|---|---|
| JP | 5-173041 A | 7/1993 |
| JP | 7-218766 A | 8/1995 |
| JP | 2704338 B2 | 10/1997 |
| JP | 2001-166179 | 6/2001 |
| JP | 2003-29089 | 1/2003 |
| JP | 2003-121693 | 4/2003 |

\* cited by examiner

AUTOMATIC OPTICAL FIBER INSERTING APPARATUS AND FIBER INSERTING METHOD

CROSS-REFERENCE TO RELATED APPLICATION

This application is a National Stage Application of PCT/IB2014/064170, filed 1 Sep. 2014, which claims the benefit of Chinese Patent Application No. CN201310428328.9 and CN201320581145.6 filed on 18 Sep. 2013 in the State Intellectual Property Office of China and which applications are incorporated herein by reference. To the extent appropriate, a claim of priority is made to each of the above disclosed applications.

BACKGROUND OF THE INVENTION

Field of the Invention

Embodiments of the present invention generally relate to fiber inserting, in particular to a fiber inserting apparatus and a fiber inserting method.

Description of the Related Art

Currently, fiber products are widely used nowadays. Traditional electric wires have been replaced with fibers due to the stability and reliability thereof particularly in network communications. However, it is necessary to pass the fibers through ceramic ferrules manually, which causes heavy workloads, low production speed and nonstandard production process, and thus it is difficult to ensure quality of products and to achieve larger-scale and standard productions.

Therefore, there is a need to improve the fiber inserting operation.

SUMMARY OF THE INVENTION

The present invention has been made to overcome or alleviate at least one aspect of the above mentioned disadvantages.

According to an aspect of the present invention, there is provided a fiber inserting apparatus comprising: a fiber clamp adapted to hold a fiber with one end of a bare fiber being exposed; a ferrule clamp adapted to hold a ferrule and opposite to the fiber clamp, the bare fiber and the corresponding ferrule defining a fiber inserting direction; a table provided with rails extending in the fiber inserting direction, at least one of the fiber clamp and the ferrule clamp being adapted to move relative to each other on the rails; and a clamp control controlling relative movement of the fiber clamp and the ferrule clamp on the rails, wherein a fiber inserting operation is performed based on the relative movement towards each other between the fiber clamp and the ferrule clamp.

In an exemplary embodiment of the present invention, the fiber inserting apparatus further comprises a straightening section including a chamber, elongated slots provided to the chamber and extending in the fiber inserting direction, wherein the slots are adapted to receive the bare fibers respectively, a first drive for driving the chamber in a first direction so that the elongated slots move close to and away from the end of the bare fiber, wherein the elongated slots are in communication with the chamber and a pressure in the chamber is smaller than that in the elongated slots when inserting the fiber.

In another exemplary embodiment of the present invention, the straightening section may comprise a guide guiding the chamber in the first direction.

In yet another exemplary embodiment of the present invention, a length of each elongated slots in the fiber inserting direction is equal to or larger than that of the bare fiber exposed from the fiber clamp.

In still another exemplary embodiment of the present invention, the straightening section is fixed in position with respect to the fiber clamp.

In another exemplary embodiment of the present invention, the fiber inserting apparatus may further comprise a second drive driving the chamber to move backwards and forwards in the fiber inserting direction. In an exemplary embodiment of the present invention, the second drive is a piston drive or a screw drive.

In another exemplary embodiment of the present invention, the fiber inserting apparatus may comprise: a chamber support; a supporting frame; a seat disposed on the supporting frame; two screws driven synchronously, each of which passing through threaded holes in the chamber support with both ends of each of the screws being supported by the seat, and the chamber support moving in axial directions of the screws parallel to the fiber inserting direction based on rotations of the screws; a hydraulic cylinder or an air cylinder disposed on the chamber support, one end of a piston rod of which being connected to the chamber, wherein the first drive comprises the hydraulic cylinder or the air cylinder and the piston rod, and the second drive comprises the two screws.

In yet another exemplary embodiment of the present invention, the table is provided with an opening between the fiber clamp and the ferrule clamp extending in the fiber inserting direction, and at least one part of the supporting frame is positioned in the opening.

In still another exemplary embodiment of the present invention, the supporting frame is fixed in position with respect to the fiber clamp, and the fiber clamp is adapted to move relative to the ferrule clamp.

In yet another exemplary embodiment of the present invention, the chamber is provided with guide rods, and the chamber support is provided with guide holes in which the guide rods are positioned when the chamber moves based on an action of the piston rod.

In another exemplary embodiment of the present invention, each of the elongated slots is a V-shape slot, a bottom of which is provided with a slit or a plurality of apertures communicated with the chamber.

In another exemplary embodiment of the present invention, the chamber is in communication with a vacuum source.

In another exemplary embodiment of the present invention, the chamber is provided with a gas sucking unit sucking gas from the chamber.

In another exemplary embodiment of the present invention, the fiber inserting apparatus may further comprise a bare fiber bend detecting section detecting a straightness of the one end of each of the bare fiber.

In yet another exemplary embodiment of the present invention, the fiber inserting apparatus may further comprise a second drive driving the chamber to move backwards and forwards in the fiber inserting direction and a straightening control controlling the first and second drives based on signals from the bare fiber bend detecting section.

In the fiber inserting apparatus according to an exemplary embodiment of the present invention, the fiber clamp is adapted to simultaneously hold a plurality of fibers in parallel and the ferrule clamp is adapted to simultaneously hold a plurality of ferrules in parallel.

In the fiber inserting apparatus according to an exemplary embodiment of the present invention, one of the fiber clamp and the ferrule clamp is provided with a guide bar, and the other one of the fiber clamp and the ferrule clamp is provided with a guide hole into which the guide bar is adapted to be inserted during the fiber inserting operation.

In the fiber inserting apparatus according to an exemplary embodiment of the present invention, the fiber clamp is adapted to simultaneously hold a plurality of fibers in parallel; the ferrule clamp is adapted to simultaneously hold a plurality of ferrules in parallel; and the straightening section comprises a plurality of elongated slots formed in parallel on the chamber, each of which corresponds to one bare fiber and one corresponding ferrule.

In another exemplary embodiment of the present invention, the fiber inserting apparatus further comprises a bare fiber bend detecting section detecting a straightness of the one end of the bare fiber.

In another exemplary embodiment of the present invention, the bare fiber bend detecting section determines whether spaces between adjacent bare fibers of a plurality of parallel bare fibers are same as each other and/or the plurality of bare fibers are located in a same plane.

In yet another exemplary embodiment of the present invention, the bare fiber bend detecting section comprises an optical camera and a camera support, and the bare fiber bend detecting section determines whether the spaces between the adjacent bare fibers of the plurality of parallel bare fibers are same as each other based on positions of the plurality of bare fibers in field of view of the optical camera, and/or determines whether the plurality of bare fibers are in the same plane based on sharpness of the plurality of bare fibers in the field of view of the optical camera. The optical camera is adapted to move parallel to a plane defined by a plurality of bare fibers in a straight state and perpendicular to the fiber inserting direction relative to the camera support.

In still another exemplary embodiment of the present invention, the optical camera and the straightening section are disposed on upper and lower sides of the bare fibers of the fibers arranged in parallel with each other, respectively.

In yet another exemplary embodiment of the present invention, the fiber inserting apparatus comprises a console, the console being located on one side of the fiber clamp in the fiber inserting direction and the camera support being located on the other side of the fiber clamp in the fiber inserting direction.

In still another exemplary embodiment of the present invention, the optical camera is a CCD camera.

In another exemplary embodiment of the present invention, the bare fiber bend detecting section comprises a space detector detecting whether spaces between the adjacent bare fibers perpendicular to the fiber inserting direction in the plane defined by the plurality of bare fibers in the straight state are same as each other, and a deflection detector detecting whether a deflection or an amount of the deflection of the one end of the each bare fiber from the plane defined by the plurality of bare fibers in the straight state exceeds a predetermined threshold.

In another exemplary embodiment of the present invention, a second drive may drive the chamber to move backwards and forwards in the fiber inserting direction, and a straightening control may control the first and second drives based on signals from the bare fiber bend detecting section.

In another exemplary embodiment of the present invention, the fiber inserting apparatus may further comprise a ferrule clamp seat disposed on the table onto which one ferrule clamp is adapted to be releasably fixed.

In another exemplary embodiment of the present invention, the fiber inserting apparatus may further comprise a ferrule clamp holder for holding the ferrule clamp to be inserted with the fiber onto and/or removing the ferrule clamp inserted with the fiber from the ferrule clamp seat.

In yet another exemplary embodiment of the present invention, the ferrule clamp has a double-layer ferrule structure comprising an upper ferrule layer and a lower ferrule layer arranged in parallel with each other.

In still another exemplary embodiment of the present invention, an engaging notch is provided on each side in a direction in which the ferrule in the ferrule clamp is arranged in parallel with each other, the ferrule clamp holder comprises two engaged arms which are movable relative to each other with one end of each engaging arm being adapted to be engaged into the engaging notch, the ferrule clamp holder further comprises a lifting mechanism and a turning mechanism connected to the lifting mechanism, and after the lifting mechanism lifts the engaged arms so that the ferrule clamp moves away from the ferrule clamp seat, the turning mechanism turns the two engaged arms to turn the ferrule clamp held by the engaging arms by 180 degrees, and the lifting mechanism moves the turned ferrule clamp onto the ferrule clamp seat.

In yet another exemplary embodiment of the present invention, the turning mechanism comprises a turning plate and a rotating member for driving the turning plate; on one side of the turning plate facing to the ferrule clamp are disposed movable guide grooves or movable rails, and the other end of each engaged arm is provided with a guide block cooperating with the movable guide grooves or movable rails; a through-hole is formed in the middle of the turning plate between two guide blocks, a driving rod passes through the through-hole, and a first joint is disposed at one end of the driving rod passing through the through-hole and near the ferrule clamp; one end of each of two connecting levels is pivotably connected to the first joint, respectively, and the other end of each connecting levels is pivotably connected to the guide block; the one end of each engaged arm is engaged into the engaging notch to hold the ferrule clamp based on a movement of the one end of the driving rod away from the turning plate, and the one end of each engaged arm is disengaged from the engaging notch based on a movement of the one end of the driving rod towards the turning plate.

In another exemplary embodiment of the present invention, the lifting mechanism comprises lifting rails and a carrying mechanism for the turning mechanism adapted to be lifted along the lifting rails.

In yet another exemplary embodiment of the present invention, the fiber inserting apparatus comprises a console, the console being located on one side of the fiber clamp in the fiber inserting direction and the lifting mechanism being located on the other side of the fiber clamp in the fiber inserting direction.

According to another aspect, there is provided a fiber inserting method comprising: providing a fiber clamp and a ferrule clamp opposite to the fiber clamp; controlling relative movement of the fiber clamp and the ferrule clamp towards each other to perform a fiber inserting operation by a control.

In another exemplary embodiment of the present invention, the method may further comprise detecting whether one end of bare fiber to be inserted on the fiber clamp is in a straight state.

In yet another exemplary embodiment of the present invention, the method may further comprise detecting or determining whether the one end of the bare fiber to be inserted on the fiber clamp is in the straight state after the fiber clamp and the ferrule clamp move towards each other by a predetermined distance.

In yet another exemplary embodiment of the present invention, the method may further comprise performing a straightening process on the one end of the bare fiber to be inserted on the fiber clamp if the one end of the bare fiber is detected not to be in the straight state.

In another exemplary embodiment of the present invention, the straightening process is performed when the fiber clamp is in a predetermined position in a fiber inserting direction.

In another exemplary embodiment of the present invention, a plurality of bare fibers are disposed in parallel on the fiber clamp and a plurality of ferrules are disposed on the ferrule clamp.

In yet another exemplary embodiment of the present invention, performing a straightening process comprises: providing a chamber provided with elongated slots extending in the fiber inserting direction, the elongated slots being in communication with the chamber and an outside air being drawn into the chamber; driving the chamber towards the ends of the bare fibers to be inserted, so that the ends of the bare fibers to be inserted are adsorbed into the corresponding elongated slots to be in the straight state suitable for the fiber inserting operation; moving the chamber backwards and forwards in the fiber inserting direction; stopping drawing the outside air into the chamber; and moving the chamber away from the ends of the bare fibers to be inserted.

In still another exemplary embodiment of the present invention, providing the chamber provided with the elongated slots comprises communicating an interior of the chamber with a vacuum source or drawing air from the chamber to form adsorption forces at the elongated slots.

In another exemplary embodiment of the present invention, detecting whether ends of bare fibers to be inserted on the fiber clamp are in a straight state comprises determining whether spaces between adjacent bare fibers of the plurality of parallel bare fibers are same as each other and/or the plurality of bare fibers are located in a same plane.

In still another exemplary embodiment of the present invention, the method may further comprise detecting the spaces between the adjacent bare fibers of the plurality of parallel bare fibers are same as each other based on positions of the plurality of bare fibers in field of view of the optical camera, and/or determining whether the plurality of bare fibers are in the same plane based on sharpness of the plurality of bare fibers in the field of view of the optical camera.

In yet another exemplary embodiment of the present invention, the method may further comprise detecting whether spaces between the adjacent bare fibers perpendicular to the fiber inserting direction in a plane defined by the plurality of bare fibers in the straight state are same as each other by a space detector, and detecting whether a deflection or an amount of the deflection of one end of each bare fiber from the plane defined by the plurality of bare fibers in the straight state exceeds a predetermined threshold.

In the method as described above, the ferrule clamp has a double-layer ferrule structure including an upper ferrule layer and a lower ferrule layer arranged in parallel with each other; after completing the fiber inserting operation on one of the upper ferrule layer and a lower ferrule layer, the method further comprises: arranging fibers on the fiber clamp, or replacing the fiber clamp arranged with the fibers; and turning the fiber clamp by 180 degrees to be ready for performing the fiber inserting operation on the other of the upper ferrule layer and a lower ferrule layer.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
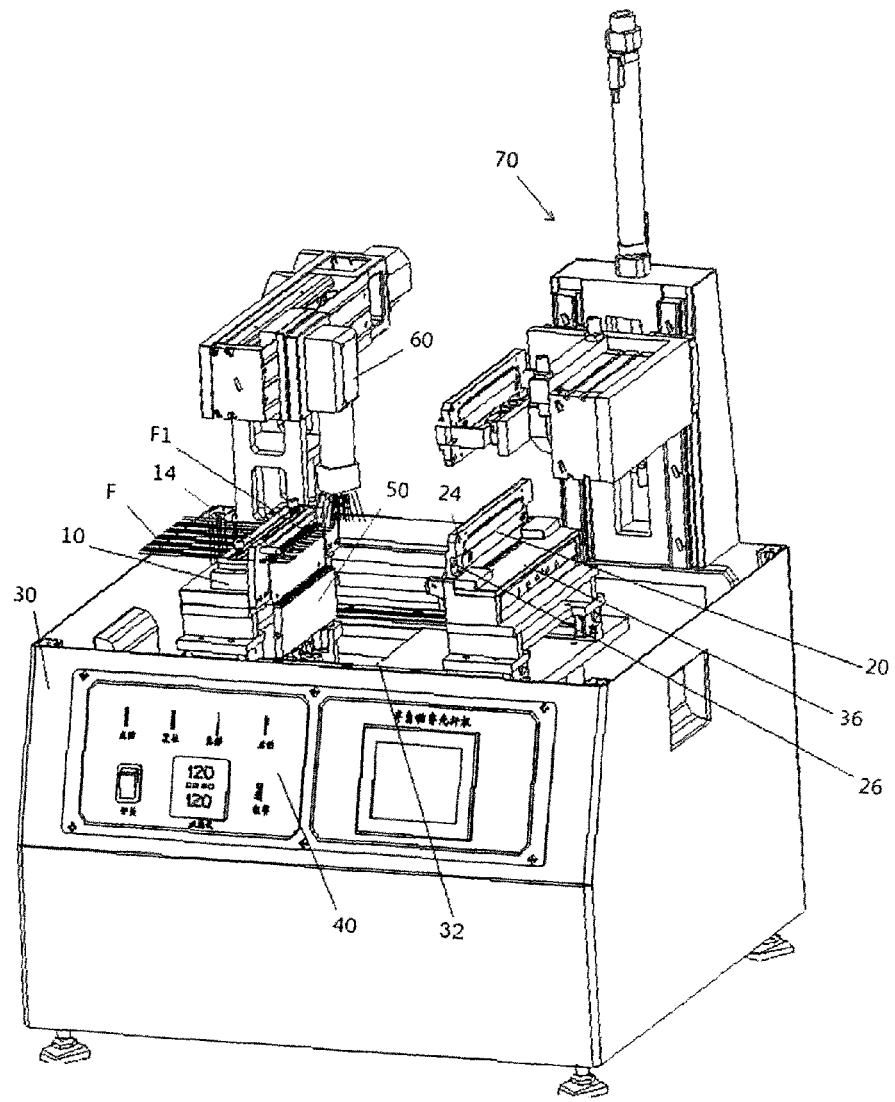
FIG. 1 is an illustrative perspective view of a fiber inserting apparatus in accordance with an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
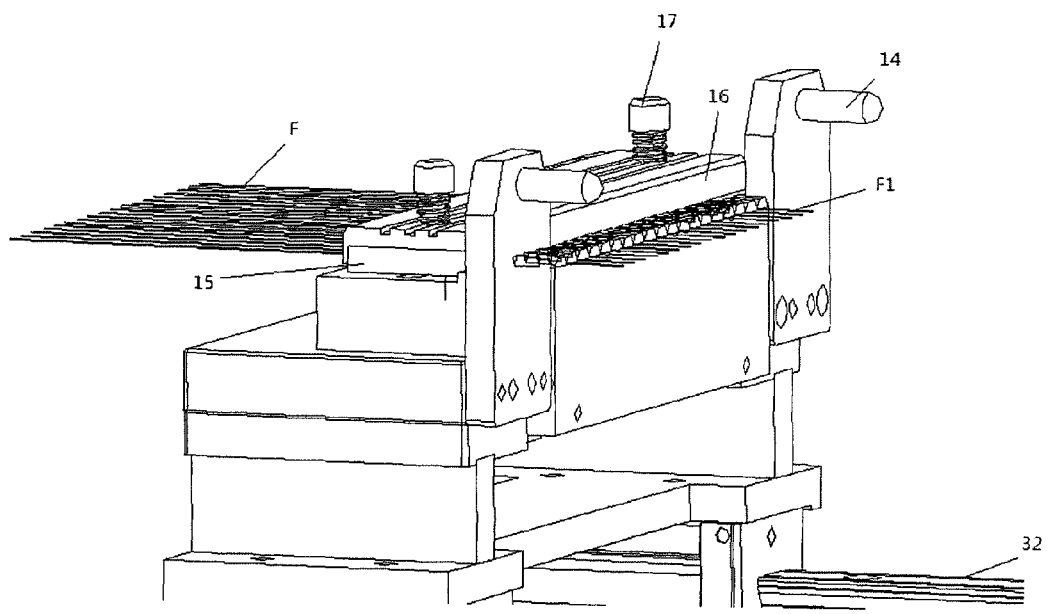
FIG. 2 mainly shows a fiber clamp and rails of the fiber inserting apparatus shown in FIG. 1.

Referring to FIGS. 1 and 2, a fiber inserting apparatus according to an exemplary embodiment of the present invention comprises: a fiber clamp 10 adapted to hold a fiber F with one end of a bare fiber F1 being exposed; a ferrule clamp 20 adapted to hold a ferrule 22 and opposite to the fiber clamp 10, the bare fiber F1 and the corresponding ferrule defining a fiber inserting direction, i.e., an extending direction of rails 32 in FIG. 1 which will be described later (a right left direction in FIG. 1); a table 30 provided with the rails 32 extending in the fiber inserting direction, at least one of the fiber clamp 10 and the ferrule clamp 20 being adapted to move relative to each other on the rails 32 (in the illustrated embodiment, the fiber clamp 10 is movable relative to the table 30, and the ferrule clamp 20 is fixed with respect to the table 30); and a clamp control 40 controlling relative movement of the fiber clamp 10 and the ferrule clamp 20 on the rails 33, for example, controlling movement of the fiber clamp 10, wherein a fiber inserting operation is performed based on the relative movement towards each other between the fiber clamp 10 and the ferrule clamp 20.

Compared to a fiber insertion in which the ferrule and the bare fiber are manually brought close to each other, controlling the relative movement of the fiber clamp and the ferrule clamp towards each other to perform the fiber inserting operation by the clamp control 40 is more reliable and efficient.

The fiber clamp 10 may be driven to move in the fiber inserting direction by means of a servo motor installed below the table, for example, in a machine table control box.

The ferrule clamp 20 may also move in the fiber inserting direction. For example, the ferrule clamp is driven by a cylinder.

Figure 3:
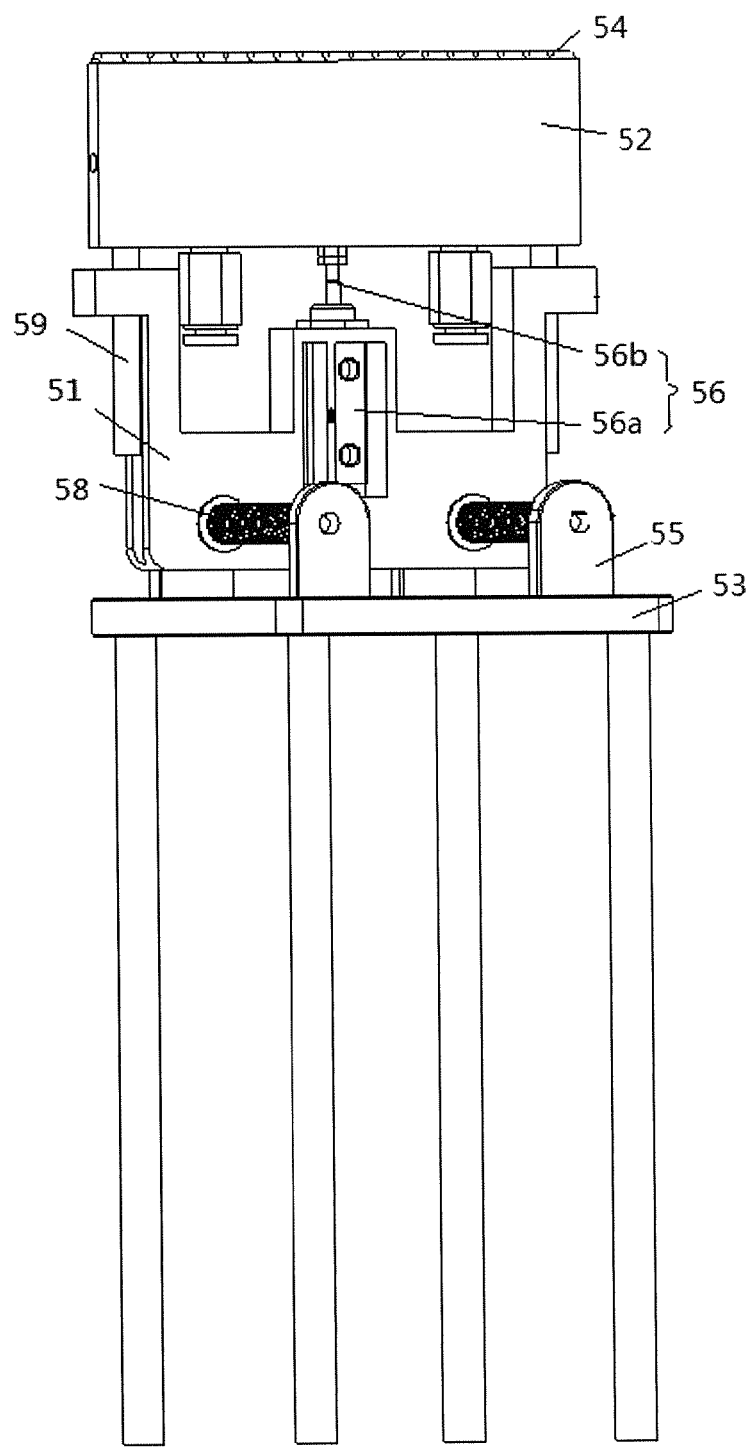
FIG. 3 is an illustrative structural view of a straightening section in accordance with an exemplary embodiment of the present invention.
Figure 4:
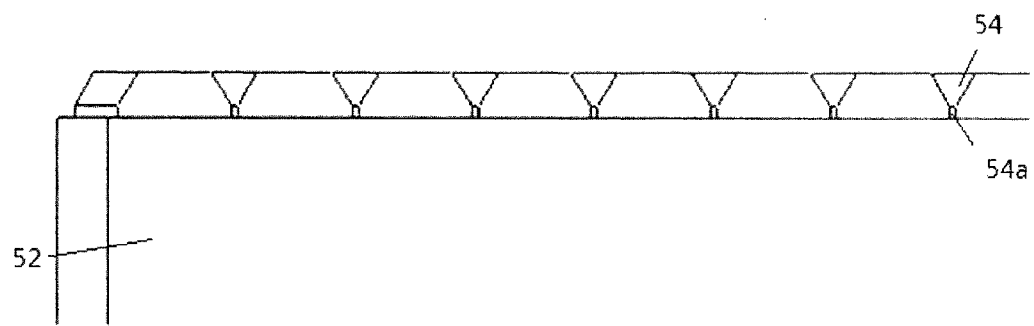
FIG. 4 is an illustrative partial enlarged view of a chamber provided with elongated slots in FIG. 3.

In order to ensure the bare fiber F1 to be inserted into its corresponding ferrule 22 in a straight posture, as illustrated in FIG. 1, a straightening section 50 may be provided. Referring to FIGS. 3 and 4, the straightening section 50 comprises:

a chamber 52;

elongated slots 54 provided to the chamber 52 and extending in the fiber inserting direction, wherein the slots are adapted to receive the bare fibers respectively;

a first drive 56 driving the chamber 52 so that the elongated slots 54 move close to and away from the one end of the bare fiber, specifically, the direction in which the elongated slots move close to and away from the one end of the bare fiber corresponds to an up-and-down direction in FIGS. 1 and 3 herein; and a second drive 58 driving the chamber 52 to move backwards and forwards in the fiber inserting direction, specifically, the direction in which the chamber 52 moves backwards and forwards corresponds to the fiber inserting direction of FIG. 1 herein.

As illustrated in FIG. 4, the elongated slots 54 are in communication with the chamber 52, and a pressure in the chamber is smaller than that in the elongated slots when inserting the fiber so that an outside air is drawn into the chamber 52. Since the outside air is drawn into the chamber 52, the bare fiber F1 located in the elongated slots 54 will be adsorbed into the elongated slots 54. The first drive and/or the second drive may be a piston drive or a screw drive.

As illustrated in FIG. 2, the fiber clamp 10 may comprise a base 15 provided with a V-shape groove (not shown) and a cover plate 16 covering the base 15. The cover plate 16 may cover the base 15 by tightening a screw 17 so as to press the fiber F against the base.

As shown in FIG. 4, each of the elongated slots 54 is a V-shape slot, a bottom of which is provided with a slit or a plurality of apertures 54a communicated with the chamber 52. The elongated slots may take other shapes such as a semicircular shape, as long as the apertures of the elongated slots near the bare fiber are larger enough to facilitate the oblique bare fiber to be adsorbed into the elongated slots. The slit or apertures 54a may extend through the entire elongated slots, and may also be only arranged along a part of a length of the elongated slots. A shape of the slit or apertures is selected based on desired adsorption force. The above description of the elongated slots may also be applicable to others of the present invention.

In order to allow the outside air to enter into the chamber 52 through the slit or apertures 54a on the elongated slots 54, the chamber 52 may be communicated with a vacuum source (not shown). Alternatively, the chamber 52 may be provided with a gas sucking unit sucking gas from the chamber (for example, see a gas sucking unit 57 in FIG. 8). Vacuum degree or suction capability of the gas sucking unit may be adjusted to regulate the adsorption force of the elongated slots 54 on the bare fiber F1.

The bare fiber F1 is in a straightening state suitable for the fiber inserting operation when being positioned in the elongated slots 54. The bare fiber F1 may be straightened by moving backwards and forwards through the elongated slots 54 in the fiber inserting direction.

Obviously, after completing the straightening operation, the adsorption force of the elongated slots 54 on the bare fiber F1 may be removed to prevent the bare fiber F1 from bending due to the adsorption force when the chamber 52 moves away from the bare fiber.

As illustrated in FIGS. 1 and 3, the fiber inserting apparatus comprises: a chamber support 51; a supporting frame 53; a seat 55 disposed on the supporting frame 53; two screws driven synchronously, each of which passing through threaded holes in the chamber support 51 with both ends of each of the screws being supported by the seat 55, the chamber support 51 moving in axial directions of the screws parallel to the fiber inserting direction based on rotations of the screws; a hydraulic cylinder or an air cylinder 56a disposed on the chamber support, one end of a piston rod 56b of which being connected to the chamber 52, wherein the first drive includes the hydraulic cylinder or the air cylinder 56a and the piston rod 56b, and the second drive includes the two screws.

However, it may not be necessary for the straightening section 50 to be provided with the second drive. In this regard, a length of each of the elongated slots in the fiber inserting direction is In an exemplary embodiment of the present invention equal to or larger than that of the bare fiber exposed from the fiber clamp.

The straightening section 50 without the second drive may not be fixed with respect to the fiber clamp. However, the straightening section 50 is preferably fixed relative to the fiber clamp 10. Particularly, referring to FIG. 8, the chamber support 51 is provided with a plurality of fixing holes 51a, and a seat for fixing the fiber clamp may be provided with fasteners, such as bolts, engaging with the fixing holes 51. In this way, a relative position of the straightening section 50 and the fiber clamp 10 is fixed such that the straightening section can move with the fiber clamp when the fiber clamp 10 moves relative to the ferrule clamp 20.

As illustrated in FIG. 1, the table 30 is provided with an opening 32 between the fiber clamp 10 and the ferrule clamp 20 extending in the fiber inserting direction. At least one part of the supporting frame 53 is positioned in the opening.

In an exemplary embodiment of the present invention, the supporting frame 53 is fixed in position with respect to the fiber clamp 10. This is, the straightening section 50 can move with the fiber clamp before the bare fiber is inserted into the ferrule and perform a straightening process on the bent bare fiber, and when performing the fiber operation, the chamber 52 can retract downwards to retract into the machine table control box for example, so that the normal fiber inserting operation is not affected. Further, the fiber clamp 10 is adapted to move with respect to the ferrule clamp 20. In this way, the supporting frame 53 and thus the chamber 52 can move with the fiber clamp 10. However, the fiber clamp 10 may not be fixed in position relative to the supporting frame 53. For example, the supporting frame 53 keeps stationary so that the straightening section 50 is always in the position shown in FIG. 1 in the fiber inserting direction. In that case, when it is necessary to perform the straightening operation, the fiber clamp 10 is need to be returned to a position suitable for performing the straightening operation, i.e., the position in which the fiber clamp is located in FIG. 1.

Figure 8:
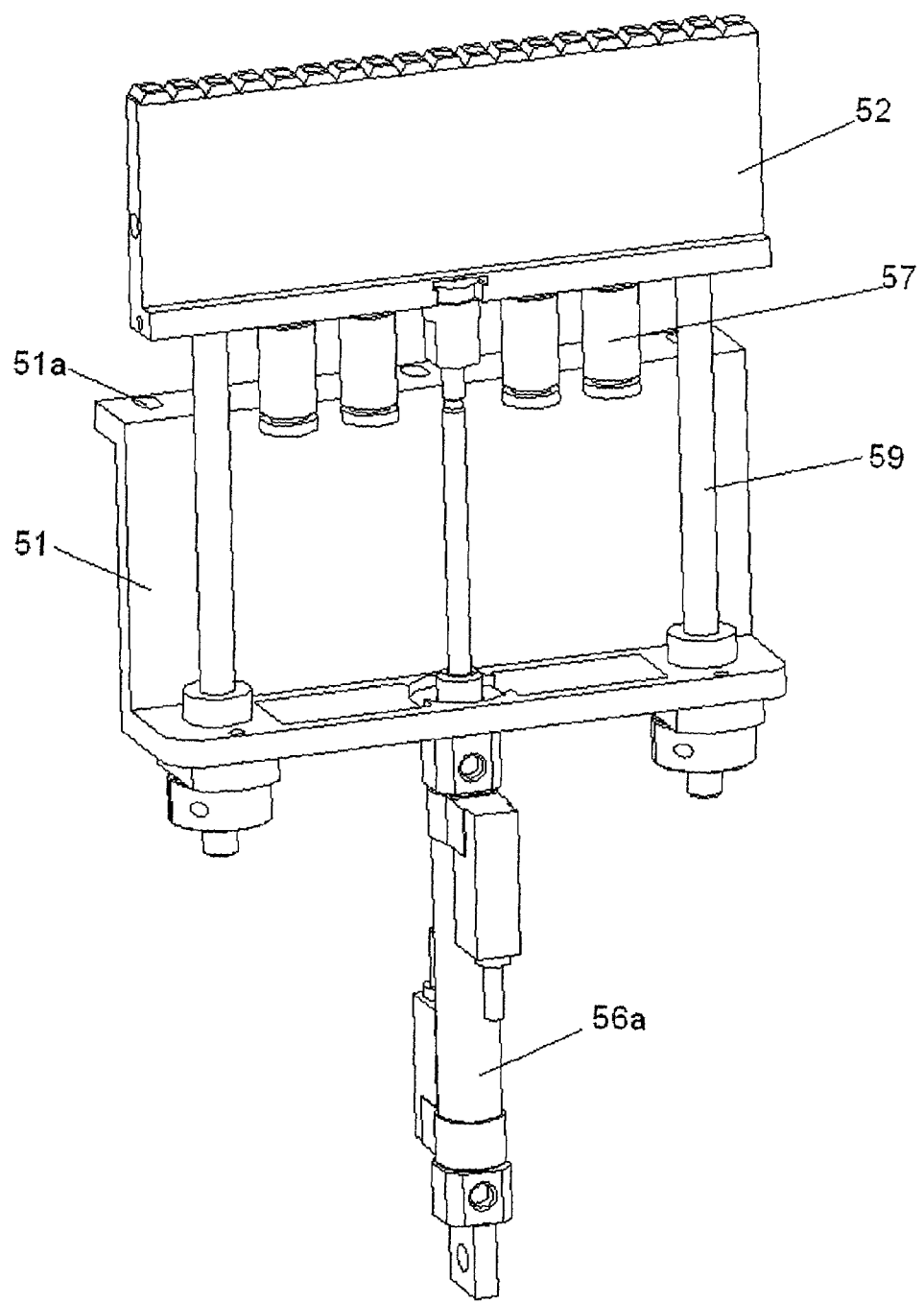
FIG. 8 is an illustrative structural view of a straightening section in accordance with another exemplary embodiment of the present invention.
Figure 9:
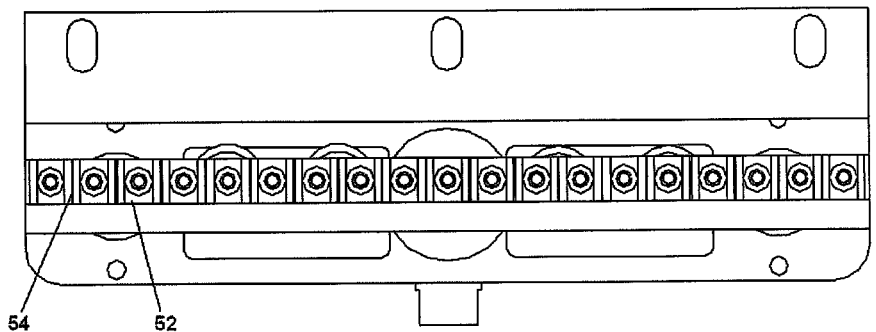
FIG. 9 is a top view of the straightening section in FIG. 8.

As illustrated in FIGS. 3 and 8, the chamber is provided with guide rods 59, and the chamber support is provided with guide holes in which the guide rods are positioned when the chamber moves based on an action of the piston rod. This ensures the chamber 52 can move for example in a vertical direction to maintain the extending direction of the elongated slots 54 to be parallel to the fiber inserting direction. As illustrated in FIG. 9, the elongated slots 54 extend in the fiber inserting direction.

The bare fiber F1 may be observed to determine whether the bare fiber is in a straight state by means of the human visual. Alternatively, a bare fiber bend detecting section 60 may be provided to detect the straightness of the one end of the bare fiber which is exposed. A straightening control may be used to control the first and second drives based on signals from the bare fiber bend detecting section.

The above example may be applicable to a case where a bare fiber of one fiber is inserted into one ferrule. Alternatively, it may be applicable to a case where a plurality of bare fibers are simultaneously inserted into their corresponding ferrules. For example, the fiber clamp 10 may be adapted to simultaneously hold a plurality of fibers in parallel and the ferrule clamp 20 may be adapted to simultaneously hold a plurality of ferrules in parallel, as illustrated in FIG. 1. For example, the fiber clamp 10 may hold 18 fibers at one time.

As illustrated in FIG. 1, one of the fiber clamp 10 and the ferrule clamp 20 (the fiber clamp 10 in FIG. 1) is provided with a guide bar 14, and the other of the fiber clamp 10 and the ferrule clamp 20 (the ferrule clamp 20 in FIG. 1) is provided with a guide hole 24 into which the guide bar 14 is adapted to be inserted during the fiber inserting operation. When the fiber clamp and the ferrule clamp are aligned with each other, the guide bar 14 can be inserted into the guide hole 24, if not, the guide bar 14 cannot be inserted into the guide hole 24. Further, the fiber clamp and the ferrule clamp can be aligned with each other due to the guidance of the guide bar and the guide hole during the fiber inserting operation.

A method for determining whether the straightening operation is needed to be performed on the bare fibers of the plurality of fibers arranged on the fiber clamp will be described below.

As for the case where the fiber clamp is adapted to simultaneously hold a plurality of fibers in parallel and the ferrule clamp is adapted to simultaneously hold a plurality of ferrules in parallel, the straightening section 50 includes a plurality of elongated slots 54 formed in parallel on the chamber 52, each of which corresponds to one bare fiber and one corresponding ferrule. In other words, if one bare fiber is straight, an extension line thereof will pass through an opening of its corresponding ferrule. When it is necessary to perform the straightening operation, the elongated slot into which the straightening operation is performed on the bare fiber is arranged so that the bare fiber is in the straight state and the extension line thereof passes through the opening of its corresponding ferrule when the bare fiber is adsorbed into the elongated slot.

In order to determine whether each bare fiber is in the straight state suitable for fiber insertion, it is necessary to provide a bare fiber bend detecting section 60 to detect a straightness of one end of each bare fiber which is exposed. An operation and a structure of the bare fiber bend detecting section 60 will be described in details below.

The bare fiber bend detecting section 60 may detect whether spaces between adjacent bare fibers of a plurality of parallel bare fibers F1 are same as each other and/or the plurality of bare fibers are located in a same plane. If the bare fiber bend detecting section 60 detects the spaces between the adjacent bare fibers of the plurality of parallel bare fibers F1 are different from each other, it is indicated that the bare fibers deflect in a fore-and-aft direction in FIG. 1 for example. If the bare fiber bend detecting section 60 detects the bare fibers are located in different planes, it is indicated that the bare fibers deflect in the up-and-down direction in FIG. 1. The bare fiber bend detecting section 60 may detect one or both of these deflections.

Figure 5:
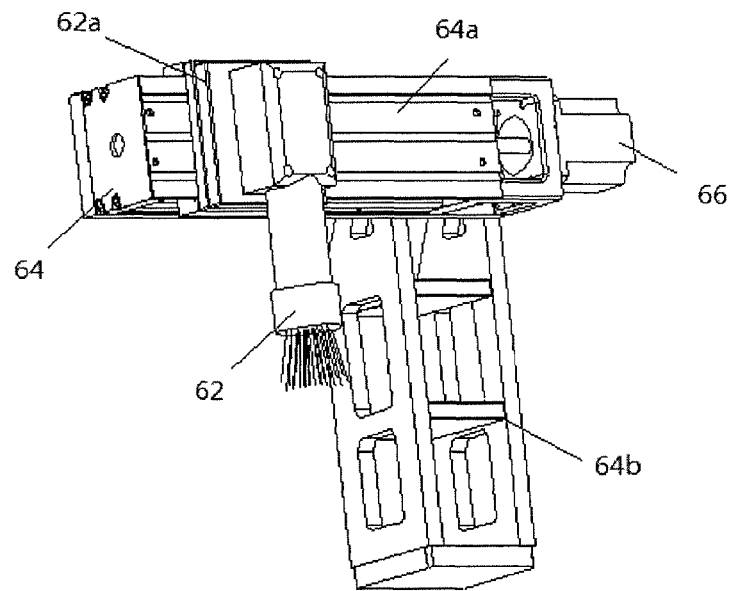
FIG. 5 is an illustrative structural view of a bare fiber bend detecting section in accordance with an exemplary embodiment of the present invention.

In a specific example, as illustrated in FIG. 5, the bare fiber bend detecting section 60 comprises an optical camera 62 and a camera support 64, and determines whether the spaces between the adjacent bare fibers of the plurality of parallel bare fibers F1 are same as each other based on positions of the plurality of bare fibers F1 in field of view of the optical camera, and/or determines whether the plurality of bare fibers are in the same plane based on sharpness of the plurality of bare fibers in the field of view of the optical camera such as a CCD (Charge Coupled Device) camera. For example, clear imaging points are located in a plane defined by the plurality of bare fibers in the straight state, and the deflection of the bare fibers F1 in the up-and-down direction will cause unclear images of the bare fibers.

As for a case where the fiber inserting operation is simultaneously performed on 18 bare fibers for example, it may be necessary for the optical camera 62 to be adapted to move relative to the camera support 64 parallel to the plane defined by the plurality of bare fibers in the straight state and perpendicular to the fiber inserting direction, particularly, in the fore-and-aft direction in FIG. 1, to scan all of the bare fibers on the fiber clamp 10. The camera support 64 is provided with rails 64a along which a camera seat 62a of the camera 62 is movable. Movement of the camera seat 62a can be achieved by a motor 66. The camera support 64 comprises a supporting seat 64b for fixing the camera support to the table.

In an exemplary embodiment of the present invention, the optical camera 62 and the straightening section 50 are disposed on upper and lower sides of the bare fibers of the fibers arranged in parallel with each other, respectively. In this way, the straightening operation can be performed on the bare fibers therebelow, and determining whether the bare fibers are in the straight state may be performed thereabove. This arrangement will facilitate effectively utilizing the space.

More particularly, as shown in FIG. 1, the fiber inserting apparatus comprises a console including the clamp control 40. The console is located on one side of the fiber clamp 10 in the fiber inserting direction (the front side in FIG. 1) and the camera support 64 is located on the other side of the fiber clamp 10 in the fiber inserting direction (the rear side in FIG. 1).

Although not shown, the bare fiber bend detecting section 60 may also include two parts, i.e., a space detector detecting whether the spaces between the adjacent bare fibers perpendicular to the fiber inserting direction in the plane defined by the plurality of bare fibers in the straight state are same as each other; and a deflection detector detecting whether a deflection or an amount of the deflection of one end of each bare fiber from the plane defined by the plurality of bare fibers in the straight state exceeds a predetermined threshold. For example, the space detector may directly measure the space between each pair of adjacent bare fibers parallel to the plane defined by the plurality of bare fibers in the straight state and then determine whether a change in the space is in a tolerable range. If the tolerable range (a threshold) is exceeded, it is necessary to perform the straightening operation. Further, the deflection detector may be a pair of light emitter and light receiver disposed on the upper and lower sides of the bare fibers arranged parallel with each other respectively. For example, the light emitter is disposed on the front side in FIG. 1, and the light receiver is disposed on the rear side in FIG. 1. Light emitted by the light emitter will reach the light receiver if not being blocked, which indicates that the deflection of the bare fibers out of the plane does not occur on this side, otherwise the deflection of the bare fibers exceeds the predetermined threshold and thus it is necessary to perform the straightening operation.

A dedicated straightening section may be provided to control the first and second drives based on signals from the bare fiber bend detecting section. The straightening section for example is disposed on the clamp control 40 for example.

The bare fiber bend detecting section 60 and the straightening section 50 perform the straightness detection and process on the fibers (the bare fibers) to be inserted into the ferrules to ensure quality and effectiveness of the fiber insertion.

In the present invention, the console may comprise the clamp control and the straightening control.

As illustrated in FIG. 1, the fiber inserting apparatus further comprises a ferrule clamp seat 36 disposed on the table 30 onto which one ferrule clamp 20 is adapted to be releasably fixed.

Figure 6:
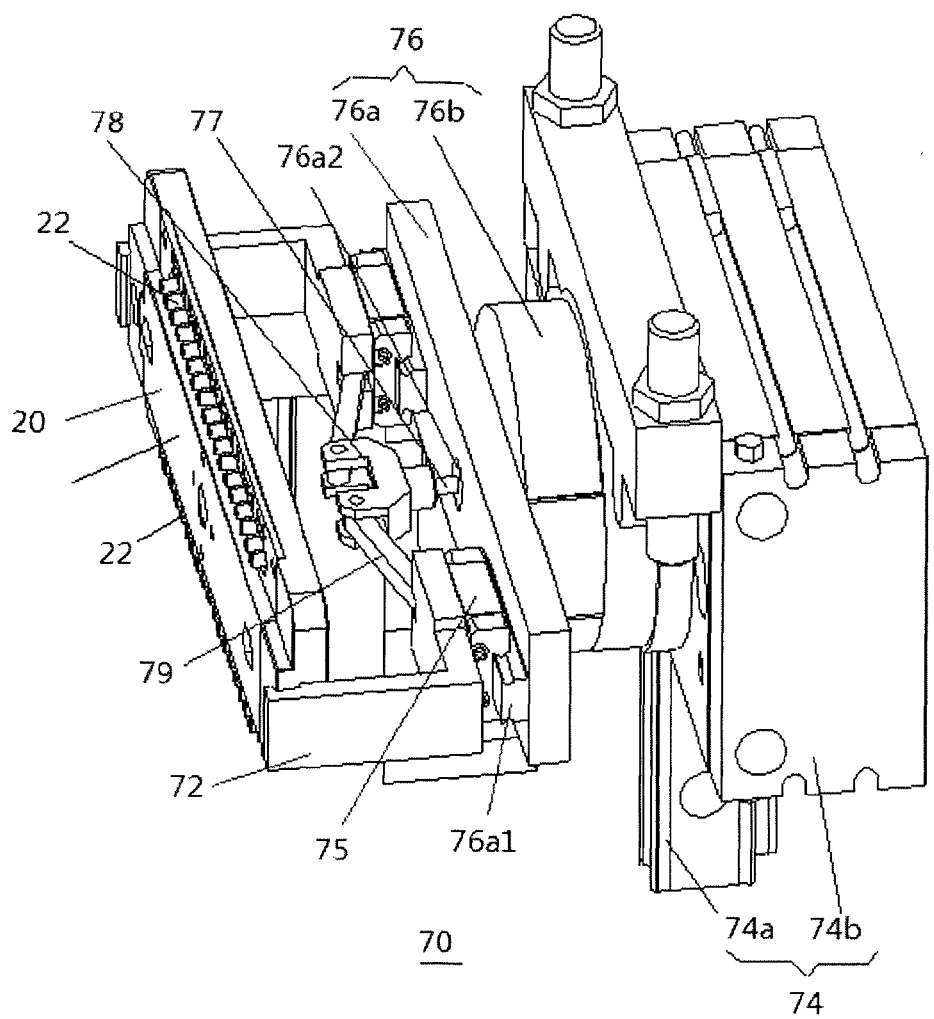
FIG. 6 is an illustrative structural view of a turning mechanism and a lifting mechanism in accordance with an exemplary embodiment of the present invention.

Referring to FIGS. 1 and 6, the fiber inserting apparatus further comprises a ferrule clamp holder 70 for holding the ferrule clamp 20 to be inserted with the fibers onto and/or removing the ferrule clamp 20 inserted with the fibers from the ferrule clamp seat 36.

Figure 7:
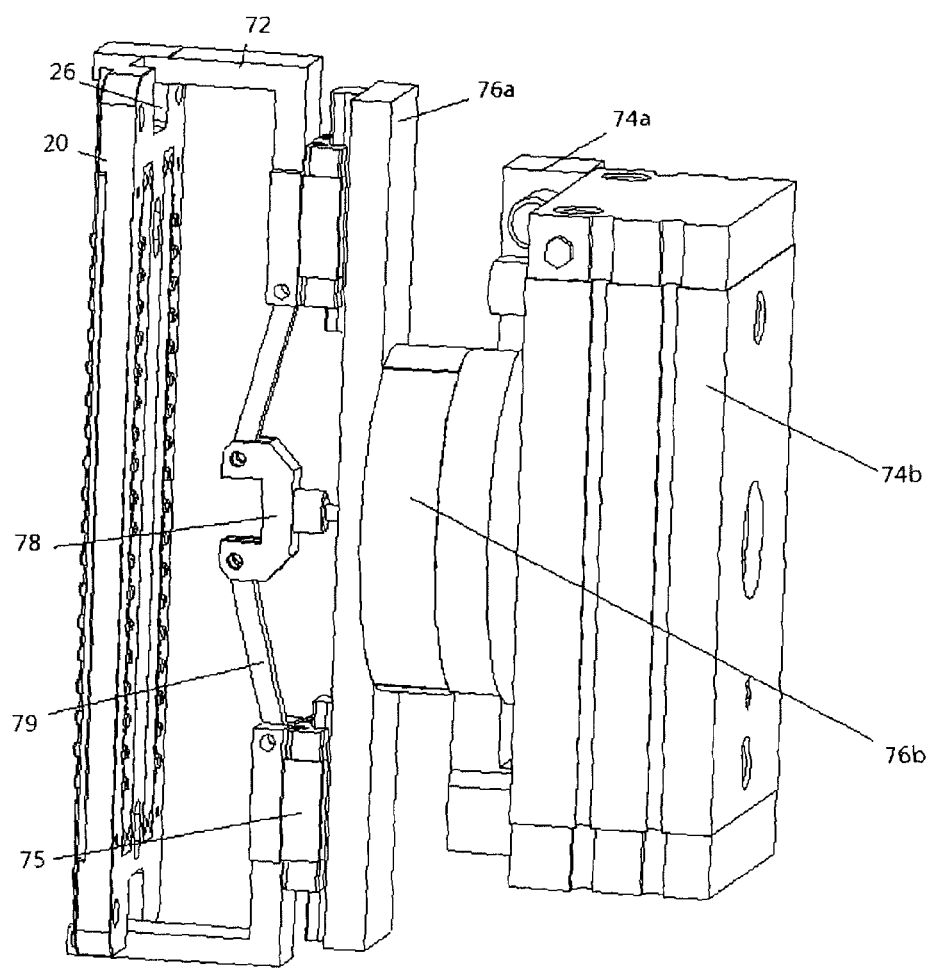
FIG. 7 is another illustrative structural view of the turning mechanism and the lifting mechanism in FIG. 6.

As illustrated in FIGS. 6 and 7, the ferrule clamp has a double-layer ferrule structure including upper and lower ferrule layers 22 arranged in parallel with each other. Referring to FIGS. 1 and 6, an engaging notch 26 is provided on each side in a direction in which the ferrules in the ferrule clamp 20 are arranged in parallel with each other, respectively. The ferrule clamp holder 70 includes two engaged arms 72 which are movable relative to each other with one end of each engaging arm being adapted to be engaged into the engaging notch 26. The ferrule clamp holder 70 further includes a lifting mechanism 74 and a turning mechanism 76 connected to the lifting mechanism 74. After the lifting mechanism 74 lifts the engaged arms so that the ferrule clamp 20 moves away from the ferrule clamp seat 36, the turning mechanism 76 turns the two engaged arms 72 to turn the ferrule clamp 20 held by the engaging arms by 180 degrees, and the lifting mechanism 74 moves the turned ferrule clamp onto the ferrule clamp seat 36.

The turning mechanism described above may comprise a turning plate 76a and a rotating member 76b for driving the turning plate. Movable guide grooves or movable rails 76a1 are disposed on one side of the turning plate 76a facing to the ferrule clamp 20 (the left side in FIG. 6). The other end of each engaged arm 72 is provided with a guide block 75 cooperating with the movable guide grooves or movable rails 76a1. A through-hole 76a2 is formed in a middle position of the turning plate 76a between two guide blocks 75. A driving rod 77 passes through the through-hole 76a2, and a first joint 78 is disposed at one end of the driving rod 77 passing through the through-hole and near the ferrule clamp (the left end in FIG. 6). One end of each of two connecting levels 79 is pivotably connected to the first joint 78, respectively, and the other end of each connecting levels 79 is pivotably connected to the guide block 75, respectively. The one end of each engaged arm 72 is engaged into the engaging notch 26 to hold the ferrule clamp 20 based on a movement of the one end of the driving rod 77 away from the turning plate 76a, and the one end of each engaged arm 72 is disengaged from the engaging notch 26 based on a movement of the one end of the driving rod towards the turning plate 76a.

After completing the fiber insertion of the ferrules on one side, the ferrule clamp 20 can be turned to perform the fiber inserting operation on the other side through the turning mechanism without removing the ferrule clamp.

As illustrated in FIGS. 6 and 7, the lifting mechanism 74 comprises lifting rails 74a and a carrying mechanism 74b for the turning mechanism adapted to be lifted along the lifting rails 74a. In an exemplary embodiment of the present invention, a mechanism providing a driving force is disposed in the carrying mechanism.

Similarly, as illustrated in FIG. 1, the console described above is located on one side of the ferrule clamp 20 in the fiber inserting direction (the front side in FIG. 1), and the lifting mechanism 74 is located on the other side of the ferrule clamp 20 in the fiber inserting direction (the rear side in FIG. 1).

Therefore, the present invention provides a semiautomatic fiber inserting machine which can insert 18 fibers at one time compared to the conventional fiber inserting machine which can only insert one fiber at one time. In addition, the turning clamp of ceramic ferrules can perform the fiber insertion on the other side without removing the ceramic ferrules. The straightening section can ensure the fibers are straight before being inserted into the ceramic ferrules, and the fiber bend detecting section can further ensure the straightness of the fibers. Therefore, the fibers can be efficiently and accurately inserted. The present invention overcomes the defect of un-straight fibers, low fiber inserting efficiency and the like occurred in the conventional fiber inserting machine.

A fiber inserting method will be described below.

The fiber inserting method comprises: providing a fiber clamp 10 and a ferrule clamp 20 opposite to the fiber clamp 10; controlling relative movement of the fiber clamp 10 and the ferrule clamp 20 towards each other to perform a fiber inserting operation by a control such as the clamp control 40 as described above. Compared to a fiber insertion in which the ferrule and the bare fiber are manually brought close to each other and observed with human visual, controlling the relative movement of the fiber clamp and the ferrule clamp towards each other to perform the fiber inserting operation by the control is more reliable and efficient.

The method described above may further comprise detecting whether an end of the bare fiber to be inserted on the fiber clamp is in a straight state. Particularly, it is possible to detect or determine whether the end of the bare fiber to be inserted on the fiber clamp is in the straight state after the fiber clamp and the ferrule clamp move towards each other by a predetermined distance.

The method described above further comprises performing a straightening process on the end of the bare fiber to be inserted on the fiber clamp if the end of the bare fiber is detected not to be in the straight state. The straightening process may be performed when the fiber clamp 10 is in a predetermined position in a fiber inserting direction, for example, when the fiber clamp 10 is in the position as illustrated in FIG. 1.

The method described above may be applicable to a case where a plurality of bare fibers are synchronously inserted into a plurality of ferrules.

In this case, performing a straightening process may comprise: providing a chamber 52 provided with elongated slots 54 extending in the fiber inserting direction, the elongated slots 54 are in communication with the chamber and an outside air is drawn into the chamber; driving the chamber 52 towards ends of the bare fibers to be inserted, so that the ends of the bare fibers to be inserted is adsorbed into the corresponding elongated slots 54 to be in the straight state suitable for the fiber inserting operation; moving the chamber 52 backwards and forwards in the fiber inserting direction; stopping drawing the outside air into the chamber 52; and moving the chamber 52 away from the ends of the bare fibers to be inserted.

Particularly, an interior of the chamber 52 is communicated with a vacuum source or air is drawn from the chamber to form adsorption forces at the elongated slots during providing the chamber provided with the elongated slots.

In the method for simultaneously inserting a plurality of bare fibers as described above, detecting whether ends of the bare fibers to be inserted on the fiber clamp are in the straight state may comprise determining whether spaces between adjacent bare fibers of the plurality of parallel bare fibers are same as each other and/or the plurality of bare fibers are located in a same plane. Particularly, it is possible to determine whether the spaces between the adjacent bare fibers of the plurality of bare fibers are same as each other based on positions of the plurality of bare fibers in a field of view of an optical camera, and/or determine whether the plurality of bare fibers are in the same place based on definitions of the plurality of bare fibers in the field of view of the optical camera. Alternatively, it is possible to detect whether spaces between the adjacent bare fibers perpendicular to the fiber inserting direction in a plane defined by the plurality of bare fibers in the straight state are same as each other by a space detector and detect whether a deflection or an amount of the deflection of one end of each bare fiber from the plane defined by the plurality of bare fibers in the straight state exceeds a predetermined threshold by a deflection detector.

In the method for simultaneously inserting a plurality of bare fibers as described above, the ferrule clamp 20 may have a double-layer ferrule structure including an upper ferrule layer and a lower ferrule layer arranged in parallel with each other. After completing the fiber inserting operation on one of the upper ferrule layer and the lower ferrule layer, the method further comprises arranging fibers on the fiber clamp, or replacing the fiber clamp arranged with fibers; and turning the fiber clamp by 180 degrees to be ready for performing the fiber inserting operation on the other of the upper ferrule layer and the lower ferrule layer.

An operational process of inserting fibers will be described below with reference to FIG. 1.

S1: as illustrated in FIG. 1, firstly installing fibers F1 in a fiber clamp 10 and installing ferrules 22 in a ferrule clamp 20 with bare fibers F1 being exposed.

S2: moving the ferrule clamp 20 to the left to a predetermined position under a drive of a cylinder.

S3: moving the fiber clamp to the right under a drive of a servomotor.

S4: moving a straightening section 50 with the fiber clamp 10 to perform a straightening process on the bare fibers F1 before the bare fibers F1 are inserted into the ferrules.

S5: performing a scan backwards and forwards by a fiber bend detecting section 60 to detect a straightness of the bare fibers F1 after the fiber clamp 10 moves to a predetermined position away from the ferrule clamp 20, the fiber clamp 10 returning to perform a further straightening process on the bare fibers F1 if the straightness of the bare fibers does not satisfy the requirement.

S6: retracting the straightening section 50 into a control box and further moving the fiber clamp 10 and the ferrule clamp 20 to move towards each other to achieve the fiber insertion on one side.

S7: after completing the fiber insertion on one side, moving the fiber clamp 10 and the ferrule clamp 20 away from each other, performing the next loading of the fiber clamp 10, and turning the ferrule clamp 20 in an up-and-down direction by a turning mechanism.

S8: repeating the process from S1.

S9: performing the next loading on the ferrule clamp 20 after completing the fiber insertion of 36 ferrules 22.

With the present invention, it is possible to simply operate the fiber insertion of 18 ferrules at a time, saving labor time and improving efficiency of the fiber insertion. In addition, the bare fiber bend detecting section and the straightening section may also ensure the quality and efficiency of the fiber insertion.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. A fiber inserting apparatus comprising:
   a fiber clamp adapted to hold a fiber with one end of a bare fiber being exposed;
   a ferrule clamp adapted to hold a ferrule and opposite to the fiber clamp, the bare fiber and the corresponding ferrule defining a fiber inserting direction;
   a table provided with rails extending in the fiber inserting direction, at least one of the fiber clamp and the ferrule clamp being adapted to move relative to each other on the rails;
   a clamp control controlling relative movement of the fiber clamp and the ferrule clamp on the rails,
   a straightening section comprising a housing defining a chamber and at least one elongated slot extending in the fiber inserting direction, wherein one of the at least one elongated slot is adapted to receive the bare fiber, and
   a first drive for driving the housing in a first direction so that the at least one elongated slot moves close to and away from the one end of the bare fiber,
   wherein a fiber inserting operation is performed based on the relative movement towards each other between the fiber clamp and the ferrule clamp; and
   wherein each of the at least one elongated slot is in communication with the chamber, wherein a pressure in the chamber is smaller than that in each of the at least one elongated slot when inserting the fiber.

2. The fiber inserting apparatus according to claim 1, wherein a length of each of the at least one elongated slots in the fiber inserting direction is equal to or larger than that of the bare fiber exposed from the fiber clamp.

3. The fiber inserting apparatus according to claim 1, further comprising a second drive for driving the housing to move backwards and forwards in the fiber inserting direction.

4. The fiber inserting apparatus according to claim 3, wherein the fiber inserting apparatus comprises:
   a housing support;

a supporting frame;

a seat disposed on the supporting frame;

two screws driven synchronously, each of which passing through threaded holes in the housing support with both ends of each of the screws being supported by the seat, and the housing support being adapted for moving in axial directions of the screws parallel to the fiber inserting direction based on rotations of the screws; and a hydraulic cylinder or an air cylinder disposed on the housing support, one end of a piston rod of which being connected to the housing, wherein the first drive comprises the hydraulic cylinder or the air cylinder and the piston rod, and the second drive comprises the two screws.

5. The fiber inserting apparatus according to claim 1, wherein each of the elongated slots is a V-shape slot, a bottom of which comprises at least one slit or at least one aperture or a plurality of apertures communicated with the chamber.

6. The fiber inserting apparatus according to claim 1, wherein the fiber clamp is adapted to simultaneously hold a plurality of fibers in parallel; and the ferrule clamp is adapted to simultaneously hold a plurality of ferrules in parallel.

7. The fiber inserting apparatus according to claim 1, wherein the fiber clamp is adapted to simultaneously hold a plurality of fibers in parallel, each of the plurality of fibers having one end of a bare fiber being exposed;

the ferrule clamp is adapted to simultaneously hold a plurality of ferrules in parallel; and the straightening section comprises a plurality of elongated slots formed in parallel on the housing, each of which corresponds to one bare fiber and one corresponding ferrule.

8. The fiber inserting apparatus according to claim 7, further comprising a bare fiber bend detecting section for detecting a straightness of the one end of each bare fiber.

9. The fiber inserting apparatus according to claim 8, wherein the bare fiber bend detecting section determines whether spaces between adjacent bare fibers of a plurality of parallel bare fibers are the same as each other and/or the plurality of bare fibers are located in a same plane.

10. The fiber inserting apparatus according to claim 9, wherein the bare fiber bend detecting section comprises an optical camera and a camera support; and the bare fiber bend detecting section determines whether the spaces between the adjacent bare fibers of the plurality of parallel bare fibers are the same as each other based on positions of the plurality of bare fibers in a field of view of the optical camera, and/or determines whether the plurality of bare fibers are in the same plane based on sharpness of the plurality of bare fibers in the field of view of the optical camera.

11. The fiber inserting apparatus according to claim 10, wherein the optical camera is adapted to move parallel to a plane defined by a plurality of bare fibers in a straight state and perpendicular to the fiber inserting direction relative to the camera support.

12. The fiber inserting apparatus according to claim 11, wherein the optical camera and the straightening section are disposed on upper and lower sides of the bare fibers of the fibers arranged in parallel with each other, respectively.

13. The fiber inserting apparatus according to claim 8, further comprising:

a second drive driving the housing to move backwards and forwards in the fiber inserting direction; and a straightening control controlling the first and second drives based on signals from the bare fiber bend detecting section.

14. The fiber inserting apparatus according to claim 9, wherein the bare fiber bend detecting section comprises:

a space detector detecting whether spaces between the adjacent bare fibers perpendicular to the fiber inserting direction in the plane defined by the plurality of bare fibers in the straight state are the same as each other; and a deflection detector detecting whether a deflection or an amount of the deflection of the one end of each of the bare fibers from the plane defined by the plurality of bare fibers in the straight state exceeds a predetermined threshold.

* * * * *